US009262239B2

(12) United States Patent
Rusu

(10) Patent No.: US 9,262,239 B2
(45) Date of Patent: Feb. 16, 2016

(54) USER-CREATABLE CUSTOM WORKFLOWS

(71) Applicant: Adobe Systems Incorporated, San Jose, CA (US)

(72) Inventor: Ionut Adrian Rusu, Bucharest (RO)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/891,753

(22) Filed: May 10, 2013

(65) Prior Publication Data

US 2014/0337863 A1 Nov. 13, 2014

(51) Int. Cl.
*G06F 9/54* (2006.01)
*G06Q 10/10* (2012.01)

(52) U.S. Cl.
CPC .............. *G06F 9/542* (2013.01); *G06Q 10/103* (2013.01)

(58) Field of Classification Search
CPC ............ G06Q 10/06; G06Q 10/06311; G06Q 20/203; G06Q 30/0269; G06Q 10/06312; G06F 17/30294
See application file for complete search history.

(56) References Cited

U.S. PATENT DOCUMENTS

| | | | | |
|---|---|---|---|---|
| 5,734,837 | A * | 3/1998 | Flores et al. | 705/7.13 |
| 2006/0059253 | A1 * | 3/2006 | Goodman et al. | 709/223 |
| 2006/0069605 | A1 * | 3/2006 | Hatoun | 705/9 |
| 2006/0158463 | A1 * | 7/2006 | Michlin | 345/634 |
| 2008/0028363 | A1 * | 1/2008 | Mathew | 717/104 |
| 2009/0006154 | A1 * | 1/2009 | Hao et al. | 705/7 |
| 2011/0276396 | A1 * | 11/2011 | Rathod | 705/14.49 |
| 2012/0151272 | A1 * | 6/2012 | Behrendt et al. | 714/39 |
| 2012/0254291 | A1 * | 10/2012 | Feldman et al. | 709/203 |
| 2013/0097618 | A1 * | 4/2013 | Han et al. | 719/318 |

OTHER PUBLICATIONS

"Zendesk User's Guide", Anton de Young, Jan. 31, 2012, pp. 1-330.*

* cited by examiner

*Primary Examiner* — Tuan Dao
(74) *Attorney, Agent, or Firm* — Wolfe-SBMC

(57) ABSTRACT

This document describes techniques enabling users to customize their applications through workflows. In contrast to often-simplistic rules, these user-selectable workflows can be arbitrary and nearly limitless in number and complexity. Further, these workflows do not require that an application designer build them by adding or altering code of the application. The techniques enable users to create workflows by connecting exposed events and exposed actions of an application. These connections, referred to as "synapses," are used by the techniques to build workflows, thereby permitting users to customize the application.

21 Claims, 9 Drawing Sheets

USER-CREATABLE CUSTOM WORKFLOWS

BACKGROUND

Software applications typically have a fixed set of rules that a user of the application may select. An email application, for example, may include, as a user-selectable option, a rule that forwards an email having a particular word in the subject line or a particular sender's email address. Or, for example, a word-processing application may include a rule that auto-corrects a selected misspelled word with a correct spelling of the word, such as correcting the misspelled word "thier" with the correct spelling "their."

Application users, however, may wish to customize their applications beyond a fixed set of rules. These desired customizations often cannot be implemented without the application's designer creating or altering code of the application. Because of this, desired customizations are time consuming and expensive for application designers to create. Furthermore, the number of customizations can be as numerous as the number of users themselves, making it impractical to address all but a few of the most-commonly requested customizations.

SUMMARY

This document describes techniques enabling users to customize their applications through workflows. In contrast to often-simplistic rules, these user-selectable workflows can be arbitrary and nearly limitless in number and complexity. Further, these workflows do not require an application designer to build them by adding or altering code of the application. Instead, the techniques enable users to create workflows by connecting exposed events and exposed actions of an application. These connections, referred to as "synapses," are used by the techniques to build workflows, thereby permitting users to customize the application.

This summary is provided to introduce simplified concepts that are further described below in the Detailed Description. This summary is not intended to identify essential features of the claimed subject matter, nor is it intended for use in determining the scope of the claimed subject matter. Techniques and/or apparatuses enabling user-creatable custom workflows are also referred to herein separately or in conjunction as the "techniques" as permitted by the context.

BRIEF DESCRIPTION OF THE DRAWINGS

Embodiments enabling user-creatable custom workflows are described with reference to the following drawings. The same numbers are used throughout the drawings to reference like features and components.

DETAILED DESCRIPTION

Overview

This document describes techniques enabling users to customize their applications through workflows. The techniques enable users to create workflows by connecting exposed events and exposed actions of an application.

Assume, for example, that a user of a word-processing application wants to customize how the application behaves. Assume further that the user is a teacher that wishes to make inline edits to correct papers, and add comments for each inline edit indicating why the change was made. The techniques enable the teacher to first select a particular event that the application can perform, here to edit a document, second to select an event filter, here to limit the workflow to only documents created by a student, and third to select an action, here to open a new comment box and place the teacher's curser in the comment box. The techniques enable the teacher, by selecting the event, event filter, and action, to build a workflow customizing the word-processing application for grading papers. The next time the teacher edits a document (the event) that was created by a student (the event filter) the workflow causes the application to open a comment box (the action).

This is but one example of the many ways in which the techniques enable a user to create a custom workflow. The following discussion turns to an operating environment, techniques that may be employed in the operating environment, and a device in which component(s) of the operating environment can be embodied. In the discussion below, reference is made to the operating environment by way of example only.

Operating Environment

Figure 1:
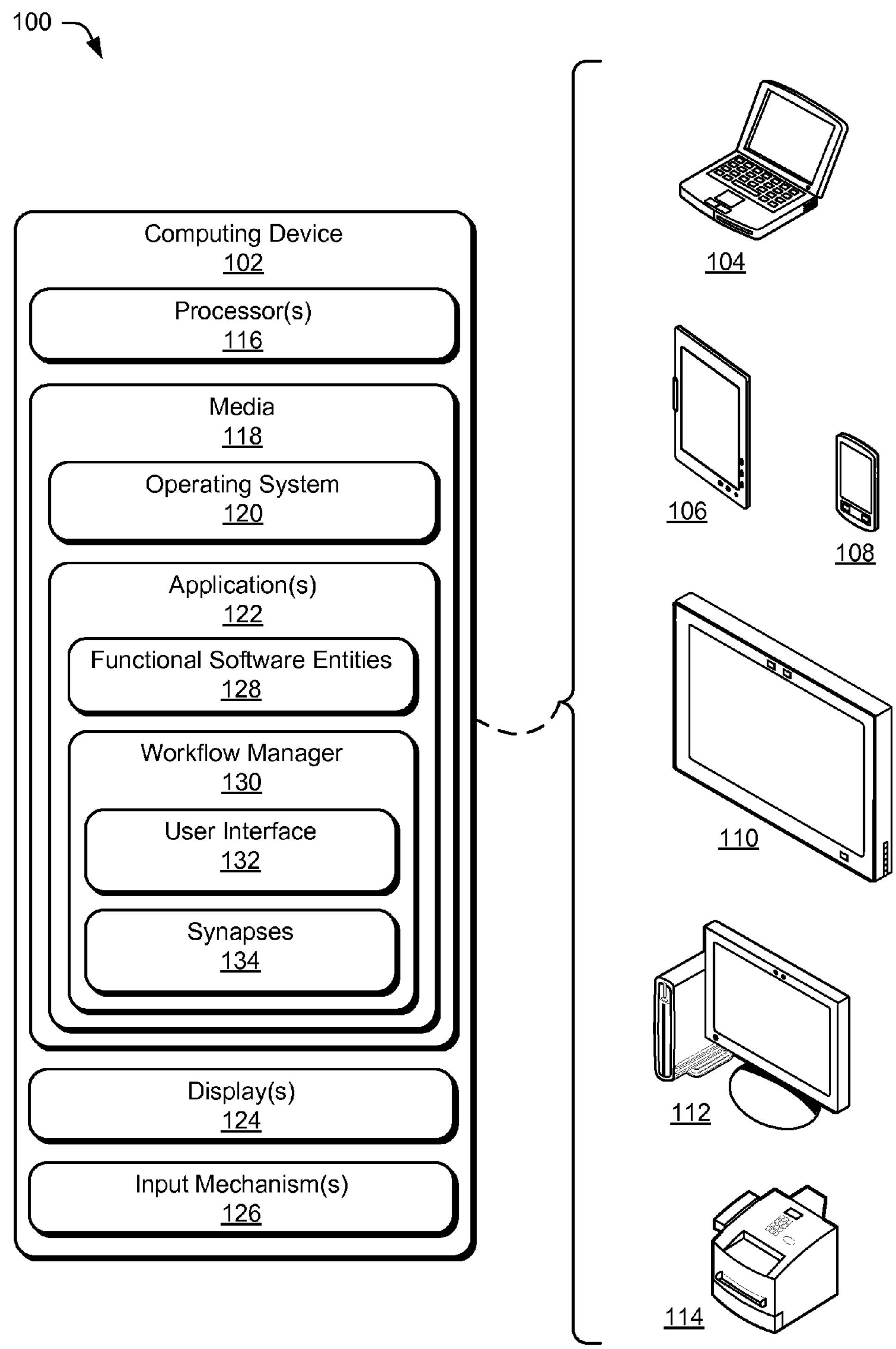
FIG. 1 illustrates an example system in which techniques enabling user-creatable custom workflows can be implemented.

FIG. 1 illustrates an operating environment 100 in which techniques that enable user-creatable custom workflows can be embodied. Environment 100 includes a computing device 102, which is illustrated with six examples: a laptop computer 104, a tablet computing device 106, a smart phone 108, a set-top box 110 (integrated into a television), a desktop computer 112, and a multi-function printer/scanner/facsimile device 114, though other computing devices and systems, such as personal-area-network devices, appliances, gaming devices, servers, and netbooks, may also be used.

Computing device 102 includes computer processor(s) 116 and computer-readable storage media 118 (media 118). Media 118 includes an operating system 120, application(s) 122, display(s) 124, and input mechanism(s) 126.

Applications 122 include, or have access to, one or more functional software entities 128 and a workflow manager 130. While shown as part of applications 122, functional software entities 128 may, in some embodiments, be stand-alone applications themselves. Further, while workflow manager 130 is shown as part of applications 122, workflow manager 130 may be separate from or be capable of being used by more than one of applications 122.

Applications 122 include software that is capable of performing various functions and operations, such as a smallbusiness application, a spreadsheet application, a word-processing application, an image-editing application, and a communication software application, to name but a few.

Functional software entities 128 can each be a collection of functions or an actual module within an application or can be a discrete and separable entity. Consider, for example, a communication software application having calendar and email functions. The group of calendar functions and the group of email functions can each be considered one of functional software entities 128. Consider also a word-processing application having text-entry functions, track-changes functions, comment functions, and spreadsheet functions. Each of these can be described as a functional software entity 128. Describing similar functions in this manner can aid users is determining which events to select when creating a workflow. This will be described as part of methods below.

Workflow manager 130 is capable of enabling users to create custom workflows. In some cases, workflow manager 130 enables a user to select synapses of event-action pairs to build into workflows. Workflow manager 130 includes, or has access to, user interface 132 and synapses 134. Workflow manager 130 can use user interface 132 to enable selection, such as through graphical selection of listed items, to build a workflow. Synapses 134 represent correspondence between an event and an action. Synapses 134 can be determined and/or selected as described in detail below. Workflow manager 130 can build these workflows responsive to user selection in various language and formats, such as the "C" family of languages or markup languages (eXtensible Markup Language (XML), liquid markup language, etc.), to name but a few.

As noted, these synapses 134 represent event-action pairs. An event is a particular activity or operation performed by application 122 (e.g., through one of functional software entities 128). This event can be caused by a user or can be performed by application 122 without interaction from the user. Consider a communication application having email and calendar functions. An email may be received without being caused by the user, or an email may be opened or sent, which is caused by the user. In any case, however, receiving, opening, or sending the email can be an event.

An action is a particular activity or operation that can be performed by application 122 responsive to occurrence of an event. A workflow can be created, for example, that automatically opens a calendar entry (an action) responsive to an email being received (an event) that is from the user's boss's secretary (one event filter) and has a subject line including the word "meeting" (another event filter). Event filters are conditions that are capable of being evaluated by workflow manager 130. If workflow manager 130 determines that the event filter is satisfied through that evaluation, workflow manager 130 causes the action to be performed.

Figure 2:
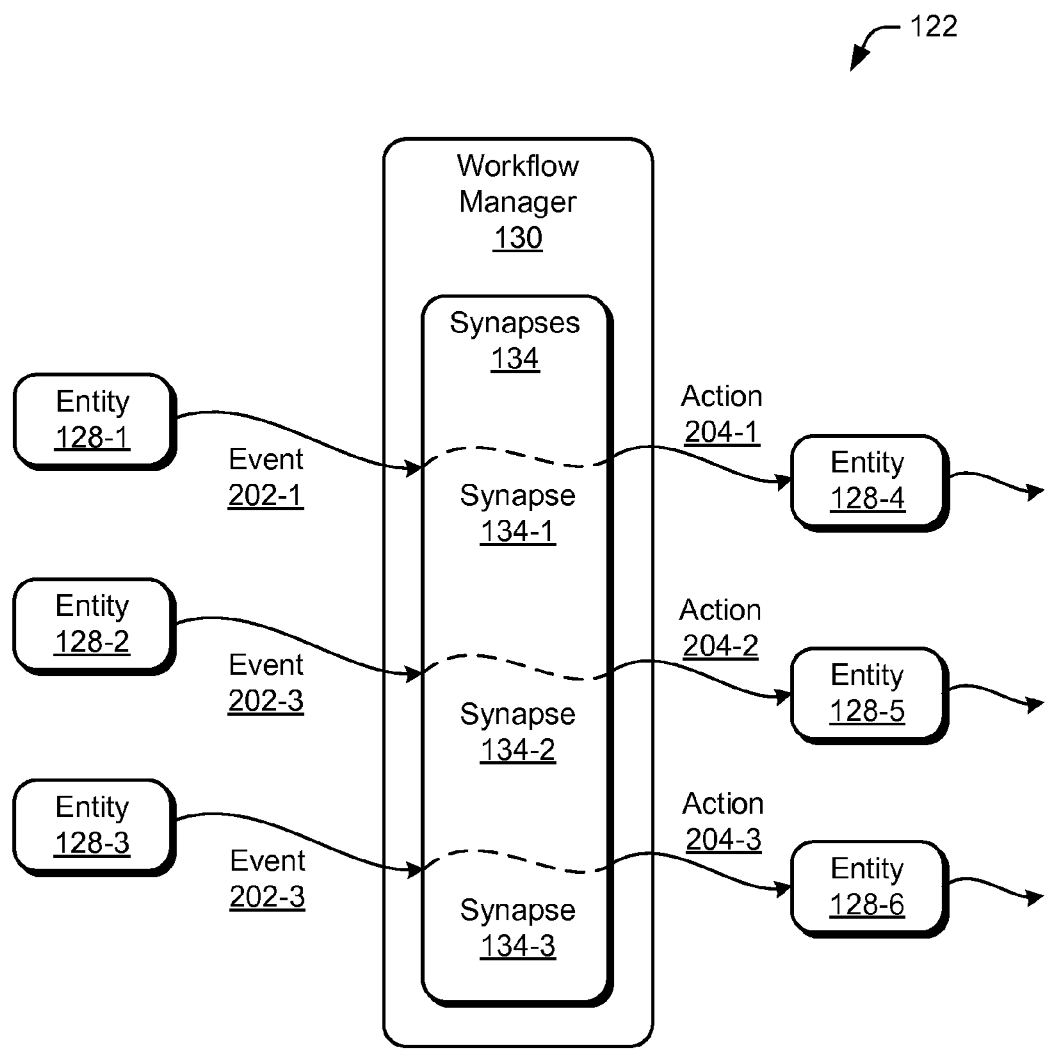
FIG. 2 illustrates an example application having functional software entities, a workflow manager, events, actions, and synapses.

Consider FIG. 2, which illustrates an example application 122 having functional software entities 128 (marked entity 128-1 to 128-6), workflow manager 130, events 202-1, 202-2, and 202-3, actions 204-1, 204-2, and 204-3, and synapses 134-1, 134-2, and 134-3. Each of these synapses 134 represents correspondence between one of events 202 and actions 204 as shown. Workflow manager 130, on occurrence of one of events 202, evaluates the appropriate synapse 134 to determine if an event filter is met (if any) and the corresponding action 204 to perform. Workflow manager 130's action 204 causes one of functional software entities 128 of application 122 to perform an operation, such as to open a calendar entry. Note that the operation caused by the action can itself be an event or result in an event (e.g., a calendar entry being completed), which in turn results in an action by workflow manager 130 and so forth.

Returning to FIG. 1, computing device 102 also includes or has access to one or more displays 124 and input mechanisms 126. Four example displays are illustrated in FIG. 1. Input mechanisms 126 may include touch-based sensors, mice (free-standing or integral with a keyboard), track and touch pads, microphones with accompanying voice recognition software, keyboards, buttons, gesture-sensitive sensors, biometric sensors, and passive environmental sensors to name but a few. Input mechanisms 126 may be separate or integral with displays 124; integral examples include gesture-sensitive displays with integrated touch-sensitive or motion-sensitive sensors.

Example Methods

Figure 3:
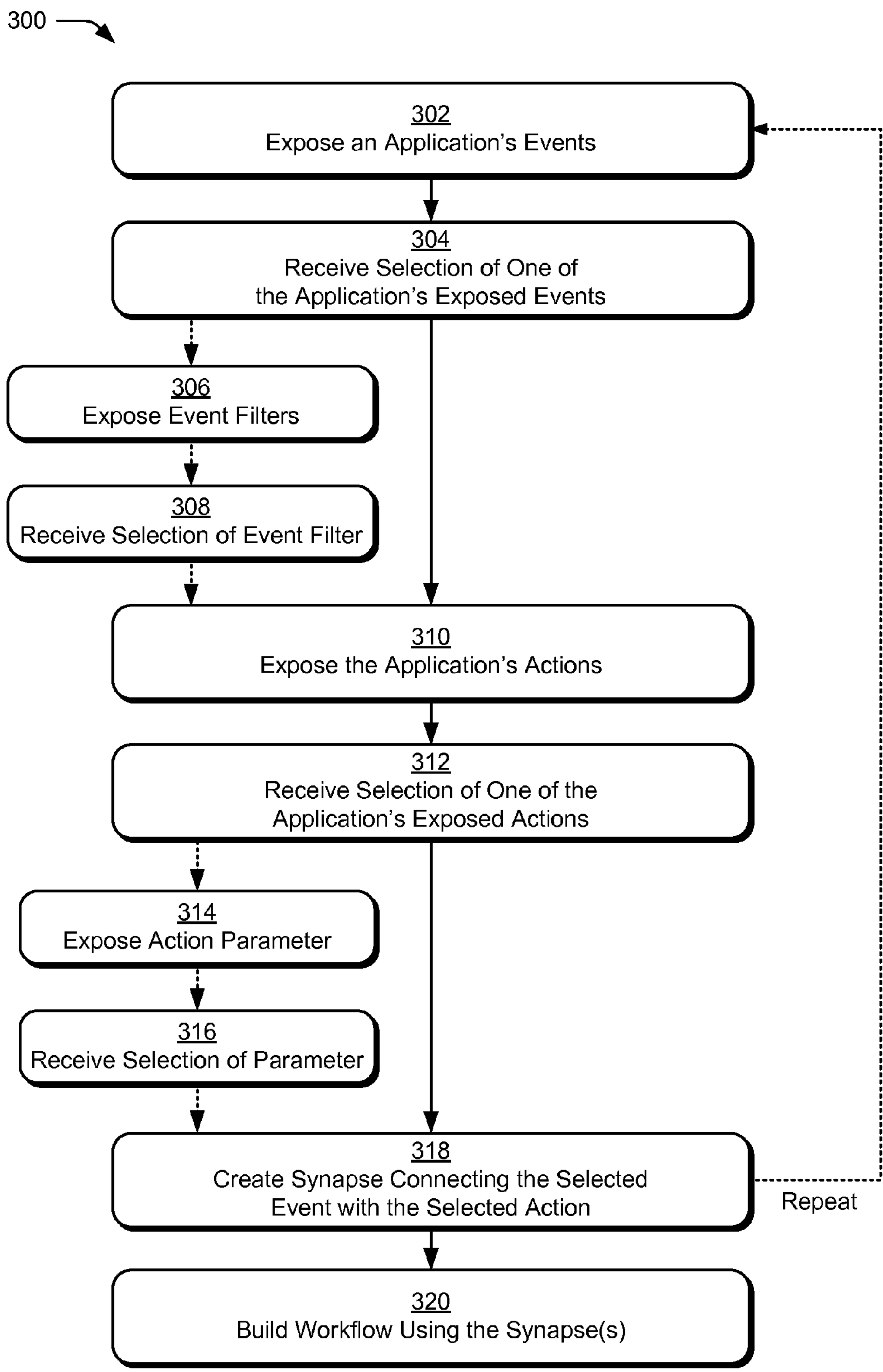
FIG. 3 illustrates example methods for enabling user-selected workflows to customize an application.

FIG. 3 depicts methods 300 enabling users to select workflows to customize an application. In portions of the following discussion, reference may be made to example environment 100 of FIG. 1 and elements of FIG. 2, reference to which is made for example only.

At block 302, an application's events are exposed. Workflow manager 130 can be designed to have a full list of events, actions, and so forth that an application is capable of performing. In some cases, however, workflow manager 130 determines events performable by application 122. In either case, however, workflow manager 130 exposes application 122's events for selection by a user.

By way of overview, an event, event filter, action, action parameter, context, or synapse is exposed by the techniques (e.g., events at block 302) by it being presented to, or selectable by, a user, including as part of a selectable synapse described in greater detail in methods 700 below. Almost any imaginable function or operation associated with a software, firmware, or hardware program (e.g., functional software entities 128), whether performable by the program, performable on the program, or detectable by the program can be exposed. As a practical matter some functions and operations may not be exposed, as they are likely to be of little interest to users, though the techniques permit exposure of even obscure functions and operations.

Selections of one or any of various events, event filters, event contexts, actions, and action parameters can be enabled through a graphically selectable list or icons, entry of text (e.g., liquid markup language), and so forth. By way of example, consider FIG. 4, which provides an example user interface 132 in which workflow manager 130 presents a graphically-selectable list having two functional software entities 402 and 404 within an entity-selection window 406. While not required, in some cases users find it helpful to select an event's context prior to selecting events. This aids in limiting the number of events presented to those associated with some set of functionality (e.g., with the selected entity) in some other contextual fashion. In this example, a user selects a "bookings" entity from which to select events, which provides this context.

Figure 4:
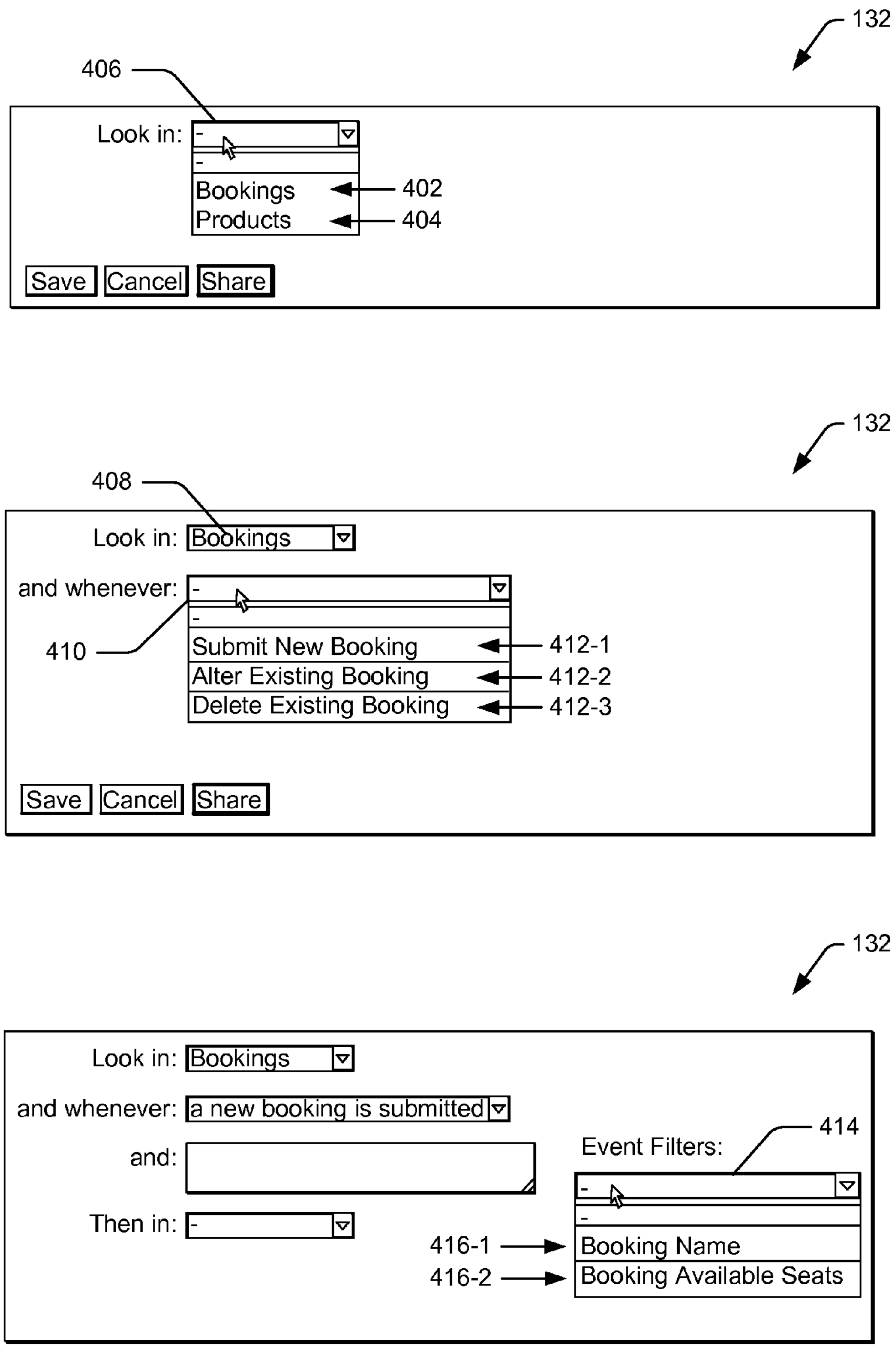
FIG. 4 illustrates example user interfaces in which the workflow manager of FIG. 2 enables selection of functional software entities, events, and event filters.

After selecting entity 402 ("bookings"), shown at selection 408, workflow manager 130 enables selection of events through an event-selection window 410 of user interface 132. These selectable events can be tailored to the selected event context, such as by being capable of being performed by the selected functional software entity named "bookings." The events exposed in FIG. 4 are those related to buying tickets for an event. Three selectable events 412 are shown at 412-1, 412-2, and 412-3. Selectable event 412-1 is a new booking submitted, selectable event 410-2 is an existing booking altered, and selectable event 410-3 is an existing booking deleted.

At block 304, selection of one of the application's exposed events is received. This can be performed in text, graphics, or otherwise. In the ongoing example, selection of a new booking event (selectable event 412-1) is received through user interface 132 and by workflow manager 130.

Optionally, methods 300 may proceed to blocks 306 and 308 to expose event filters and receive selection of an event filter, respectively. An example of this exposing and receiving selection is shown in FIG. 4, which illustrates an event-filter-selection window 414 of user interface 132. Event-filter-selection window 414 includes two selectable event filters 416-1 and 416-2, the first being a booking name and the other available seats remaining Selection of an event filter, in this case, requires some additional information for the event filter to be effective. Here after selecting event filter 416-2 (available seats remaining), user interface 132 presents an event-filter parameter window 502 show in FIG. 5, which enables entry of a number of the seats at which to meet the event filter's condition. As shown, this is entered as "<4" and as such, the event filter is only met if the number of available seats is 1, 2, or 3.

At block 310, an application's actions are exposed. This can be performed in various manners, such as text, icons, drop-down lists, and so forth. Similarly as noted for event contexts, the techniques may enable selection of action contexts. Continuing the ongoing example, consider again FIG. 5, which illustrates two graphically-selectable functional software entities 504 and 506 within an entity-selection window 508. In this example, a user selects a "twitter" entity from which to select events. Thus, the user has selected an action context, here a functional software entity of this application, which can be used to tailor exposed actions to those that are capable of being performed by the functional software entity named "Twitter™."

At block 312, selection of an application's exposed action is received. As noted above, the exposed events and actions can be internal to a same application, though this is not required. An event or action is internal to an application when it is performed by the application, rather than some other application. In this context, one application may include numerous functional software entities, and thus the events and actions of those numerous functional software entities are internal to the one application. In some cases, however, one application may perform events that are connected to actions performed by another application. For example, email functions of an email application and graphic design functions of a graphic design program. Methods 300 permit a workflow to be built when events and actions are internal to different applications. Thus, an email event that is internal to the email application can be connected to a graphics action that is internal to the graphic design program.

For an ongoing example, however, assume that the events and action are both internal to the application, meaning that they are performed by the application and without the event or action being performed by a separate, standalone application. Selection is illustrated at action-selection window 510 of FIG. 5, which shows selection of "Update Status" at exposed action 512.

Figure 6:
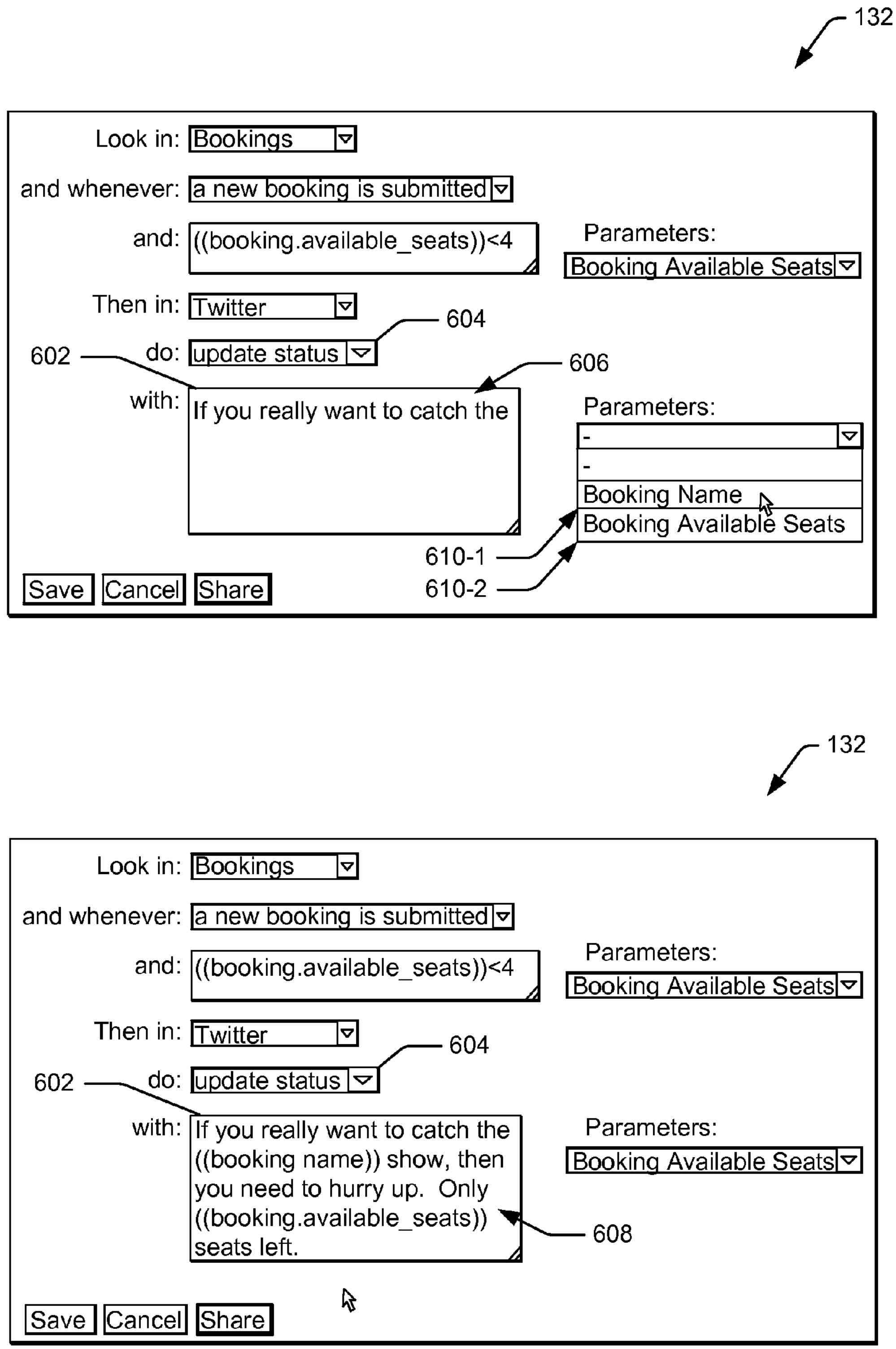
FIG. 6 illustrates example user interfaces in which the workflow manager of FIG. 2 enables selection of action parameters.

Optionally, methods 300 may proceed to blocks 314 and 316 to expose and receive selection of an action parameter, respectively. Action parameters can map to values, text, and so forth. In this case a name of an event and a number of seats left are varying values, and entered text is a static action parameter. In FIG. 6, for example, action parameter selection window 602 of user interface 132 receives text from the user, the text being text that will be sent in a "tweet" on performance of the action, the selected action shown at action field 604. This text is shown at text 606 and then further text is received, shown at text 608. Workflow manager 130 also receives selection of a value that can vary, which is filled in by application 122, namely by selecting variable value parameters 610-1 or 610-2, which in this case are the same as event filters 416-1 and 416-2 of FIG. 4. These value parameters 610 include a booking name and a number of available seats as shown, which vary with the event booked and the seats available.

At block 318, a synapse connecting the selected event with the selected action is created. This synapse can connect as little as a single event with a single action, though in this example event contexts, event filters, and action parameters are also included in the synapse. This synapse can make up the whole of the workflow, though in some cases multiple synapses are created, shown at "Repeat" arrow 320. This and other synapses can be combined into a workflow. Thus, methods 300 enable a user to create a custom workflow having a complex or simple structure, and having as few as one or as many as hundreds of synapses.

At block 320, a workflow is built using the one or more synapses. This workflow is configured to cause the application to perform the selected action responsive to the selected event. Concluding the ongoing example, once this workflow is created, when a customer uses the application to buy tickets (the event) to the 4:00 showing of the play "Les Misérables," for example, and fewer than four tickets are still available to that showing of the play (the event filter), which we assume here is a total of two tickets, a tweet is sent (e.g., to a customer list) having the following text:

> If you really want to catch the 4:00 showing of the Les Misérables show, then you need to hurry up. Only two seats left.

Figure 7:
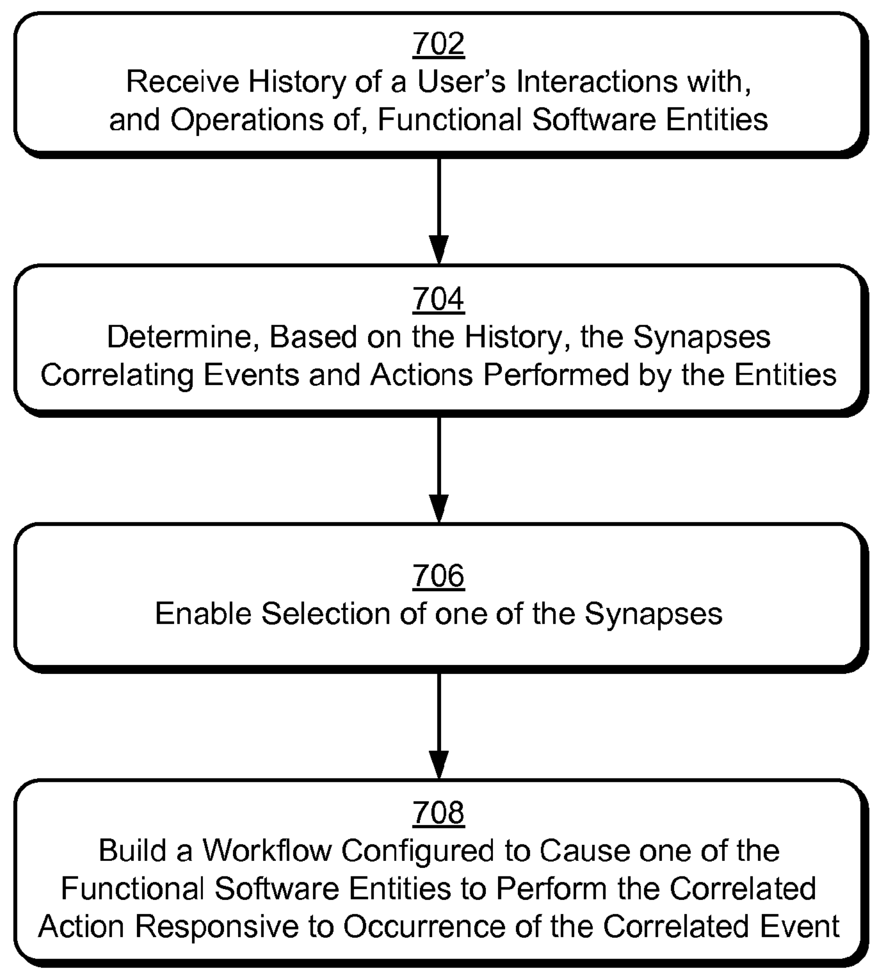
FIG. 7 illustrates example methods for building a workflow based on a history of a user's interactions with functional software entities.

FIG. 7 depicts methods 700 for building a workflow by determining correlations between events and actions based on a history of a user's interactions with, and operations of, functional software entities.

At block 702, a history that includes a user's interactions with, and operations of, functional software entities is received. This history of user's interactions includes a record of operations performed by the functional software entities and interactions with the functional software entities by the user. This record can also include timing of the operations and interactions. While receiving the history can be a passive operation, in some cases receiving the history includes scanning an activity log of the user.

At block 704, correlations between events and actions are determined based on the history. These events and actions can be determined from the operations performed by the functional software entities as recorded in the history. Operations of the functional software entities can be events or actions, as noted above. Thus, an entity performing an operation of sending an email, opening a comment box, or zooming into a map, for example, can be determined to be an event or an action. The action is correlated to a prior event, though particular operations can be determined to be events or actions. Further, operations in the history can be correlated based on the user's interactions. For example, a user causing an entity to perform the operation of opening a comment box can be an event and a correlated action can be filling in text from an email, or the event can be filling in text by a user into the comment box from an email and the action be closing the comment box.

As noted, this history of user interactions can include timing. In such a case, workflow manager 130 can determine an amount of time between operations performed by the functional software entities and the interactions with the functional software entities by the user. This amount of time can be used to determine the correlations, such as correlating a user's interactions with the functional software entities that are performed immediately after operations performed by the functional software entities.

Also as noted above, a history can be a result of scanning an activity log of a user. In such a case, determining correlations at block 704 includes finding patterns of activities (e.g., that are sequential or otherwise related) and building synapses for pairs of these activities. Each of these activities can be an interaction by a user or an operation by a functional software entity, both of which can be an event or an action of a workflow.

Consider, for example, a case where a user activity log shows that the user consistently opens a calendar entry responsive to receiving an email when that email is from the boss's secretary and has the following words in the subject line: "set up meeting." In this example, the received email is the event, one event filter is the secretary's email address in the "from" line and another event filter is the words "set up meeting" in the subject line. The action is opening a calendar appointment. Thus, a workflow with these elements can automatically open a calendar appointment when such an email is received. Methods 700 can automatically determine a synapse based on this user's history, present the synapse for selection by the user, and then build a workflow responsive to selection.

At block 706, selection of one or more synapses is enabled, each synapse represents an action correlated with an event. As noted above, this can be performed in various manners, including through graphical selection in a graphical user interface, though this is not required. Further, these synapses can include event-action pairs, which may also include event filters, event context, action parameters, and/or action context, as noted above.

Figure 5:
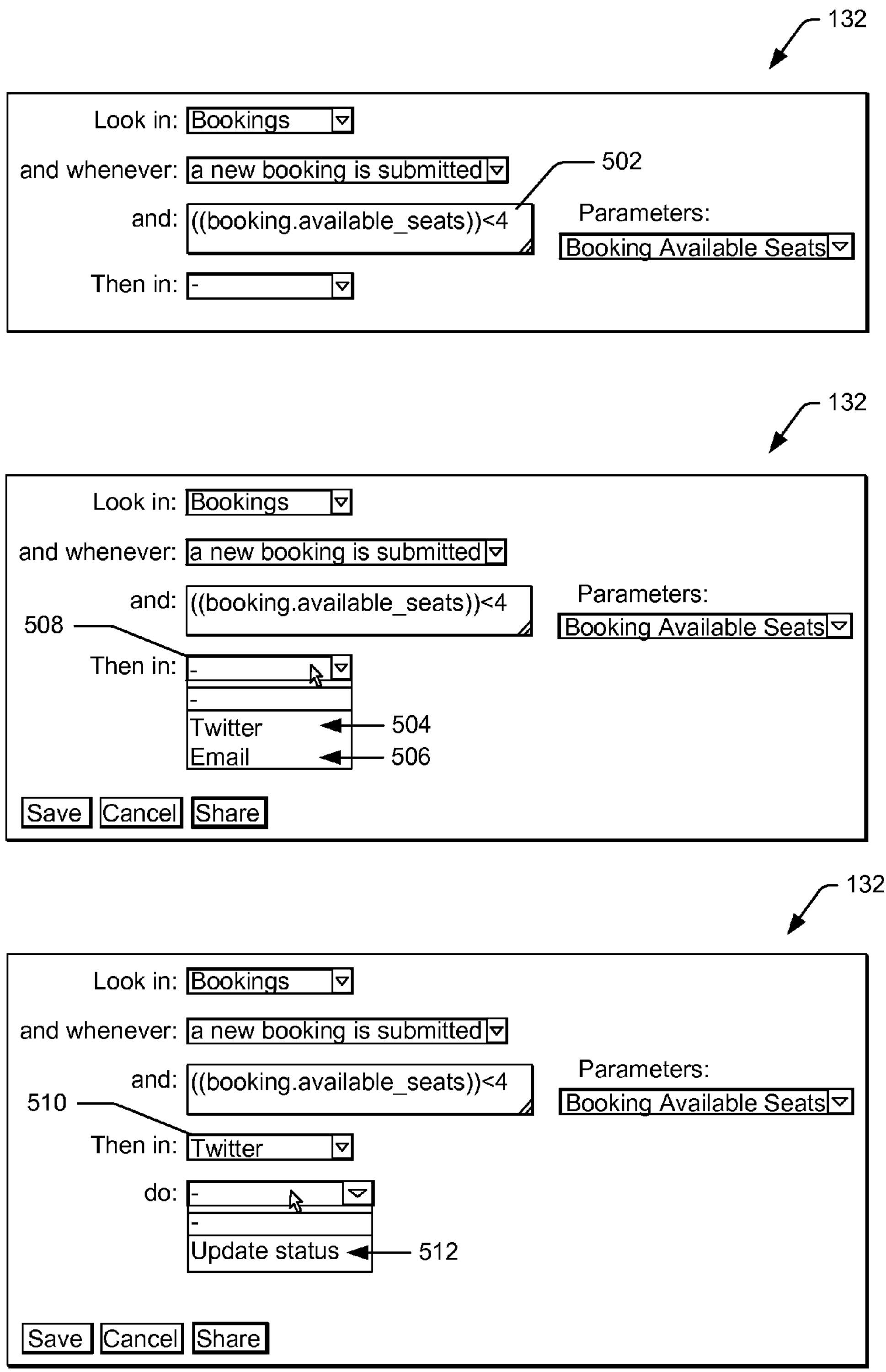
FIG. 5 illustrates example user interfaces in which the workflow manager of FIG. 2 enables selection of action contexts and actions.

Continuing the ongoing example, assume that methods 700 present this synapse showing a correlation between receiving the email and opening the calendar entry, along with event filters. A user may then select this synapse from which to build a workflow, or combine with other synapses, or alter the event filters or add action parameters, and so forth. The user may add an action parameter to automatically enter text from the body of the email into the calendar entry along with some standard text that the user wishes to add. Examples of selections and alterations through an interface are shown in FIGS. 4-6.

At block 708, a workflow is built, the workflow configured to cause one of the functional software entities to perform the correlated action responsive to occurrence of the correlated event, the workflow built responsive to selection of one or more synapses. Some of the above examples focus on single-synapse workflows, though multi-synapse workflows can also be built.

Figure 8:
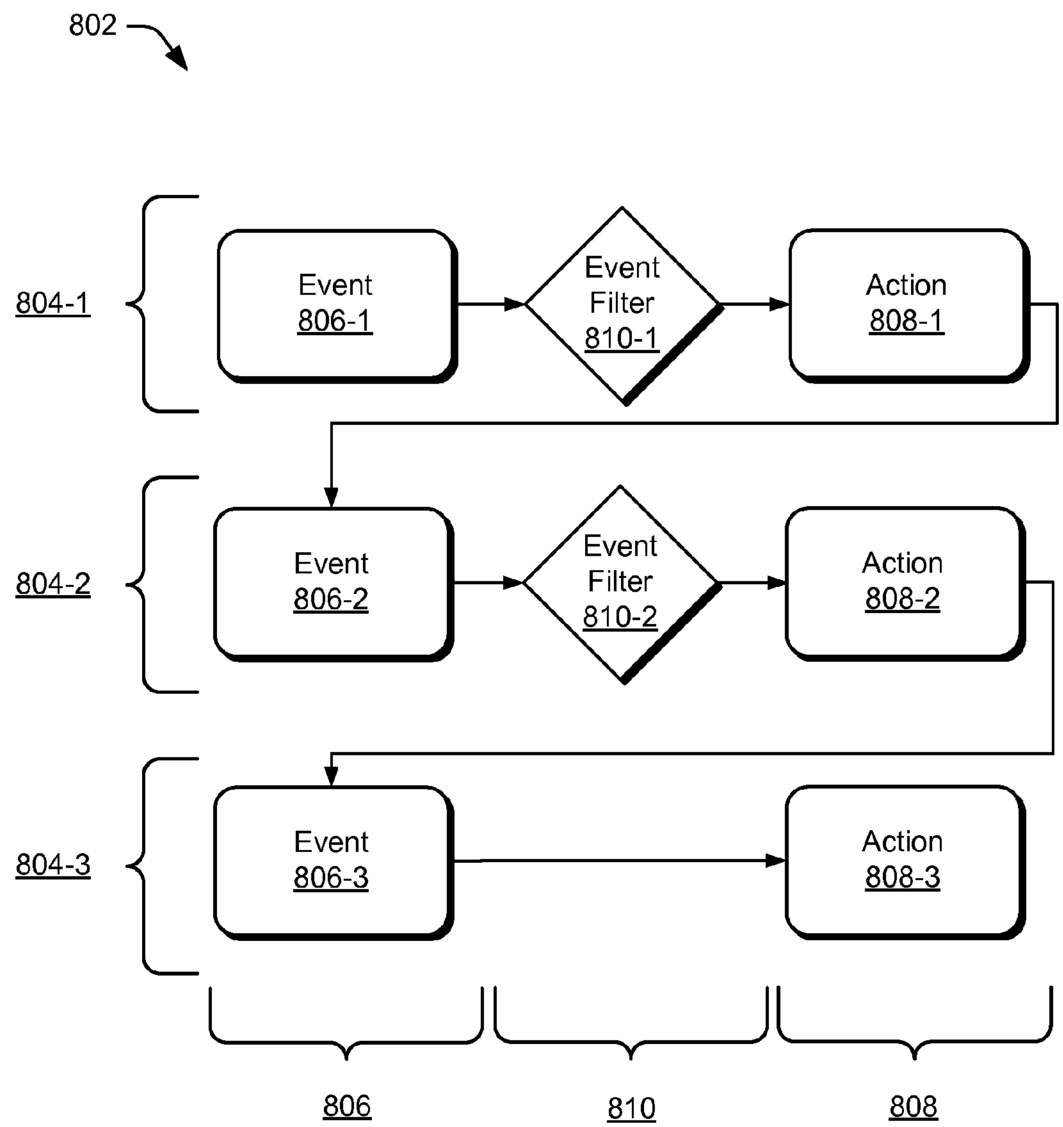
FIG. 8 illustrates a three-synapse workflow.

Consider, for example, FIG. 8, which illustrates a three-synapse workflow 802. Three synapses 804 are shown, marked at synapse 804-1, 804-2, and 804-3. Note that each synapse 804 is shown having one of events 806, shown at event 806-1, 806-2, and 806-3. Each synapse 804 also includes one of actions 808, shown at action 808-1, 808-2, and 808-3. Event filters 810, shown at event filters 810-1 and 810-2, may be included but are not required. Each of the first two actions, action 808-1 and 808-2 causes, or causes along with user interaction, action 808-1 and 808-2 respectively. This causation is shown at arrows 812 and 814, also respectively. Thus, one event 806-1 can cause action 808-1, which in turn causes event 806-2 (or the action is event 806-2), which in turn causes action 808-2, which in turn causes event 806-3 (or the action is event 806-3), which in turn causes action 806-3, after which workflow 802 ends.

Assume, for example, that an artist using an image-processing application repeatedly selects small elements (e.g., a branch of a pine tree or a soccer ball on a soccer field) of high-resolution photographs, zooms those elements to a 10× larger size, changes a color of some part of that element (e.g., a pine needle on the branch or a maker's mark on the soccer ball), zooms back to the original view, and re-centers the photograph. In this example, event 806-1 is selection of an element where the element is smaller than 20×20 pixels (one of event filters 810), action 808-1 is a zoom increasing the size of the element (e.g., to 200×200 pixels), event 806-2 is completion of a color change made to a portion of the element within that increased-size element, action 808-2 is a zoom out back to the original size, event 806-3 is that zoom out also (thus, no intermediate user interaction is needed), and action 808-3 re-centers the photograph. Thus, the techniques enable the artist to automate and make consistent repetitive actions without necessitating that a software designer create custom code.

The preceding methods are shown as sets of blocks that specify operations performed but are not necessarily limited to the order shown for performing the operations by the respective blocks. Furthermore, these methods, in whole or in part, can be used in combination.

Aspects of these methods may be implemented in hardware (e.g., fixed logic circuitry), firmware, a System-on-Chip (SoC), software, manual processing, or any combination thereof. A software implementation represents program code that performs specified tasks when executed by a computer processor, such as applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computing devices.

Example Device

Figure 9:
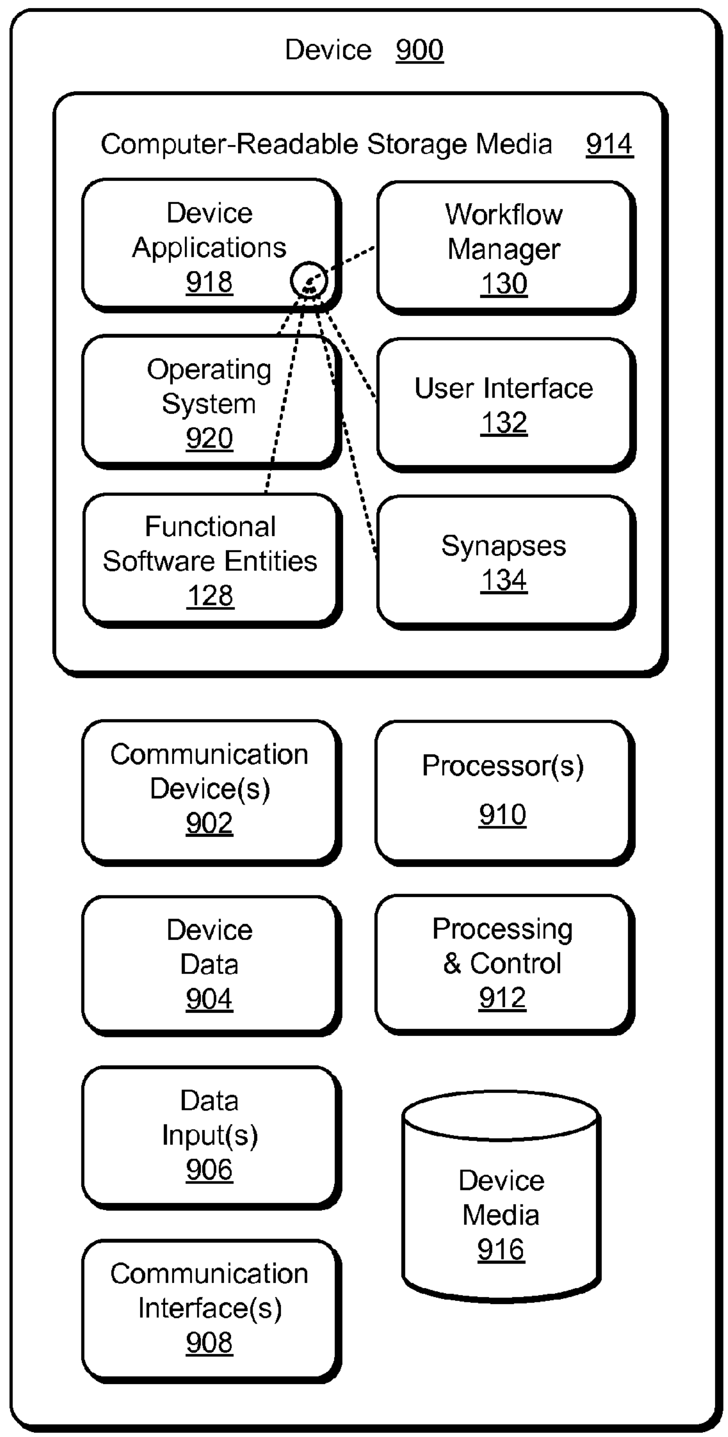
FIG. 9 illustrates an example device in which techniques enabling user-creatable custom workflows can be implemented.

FIG. 9 illustrates various components of example device 900 that can be implemented as any type of client, server, and/or computing device as described with reference to the previous FIGS. 1-8 to implement techniques and/or apparatuses enabling user-creatable custom workflows. In embodiments, device 900 can be implemented as one or a combination of a wired and/or wireless device, as a form of television client device (e.g., television set-top box, digital video recorder (DVR), etc.), consumer device, computer device, server device, portable computer device, user device, communication device, video processing and/or rendering device, appliance device, gaming device, electronic device, and/or as another type of device. Device 900 may also be associated with a user (e.g., a person) and/or an entity that operates the device such that a device describes logical devices that include users, software, firmware, and/or a combination of devices.

Device 900 includes communication devices 902 that enable wired and/or wireless communication of device data 904 (e.g., received data, data that is being received, data scheduled for broadcast, data packets of the data, etc.). The device data 904 or other device content can include configuration settings of the device, media content stored on the device, and/or information associated with a user of the device. Media content stored on device 900 can include any type of audio, video, and/or image data. Device 900 includes one or more data inputs 906 via which any type of data, media content, and/or inputs can be received, such as user-selectable inputs, messages, music, television media content, recorded video content, and any other type of audio, video, and/or image data received from any content and/or data source.

Device 900 also includes communication interfaces 908, which can be implemented as any one or more of a serial and/or parallel interface, a wireless interface, any type of network interface, a modem, and as any other type of communication interface. The communication interfaces 908 provide a connection and/or communication links between device 900 and a communication network by which other electronic, computing, and communication devices communicate data with device 900.

Device 900 includes one or more processors 910 (e.g., any of microprocessors, controllers, and the like), which process various computer-executable instructions to control the operation of device 900 and to enable techniques enabling a tailored OS learning experience. Alternatively or in addition, device 900 can be implemented with any one or combination of hardware, firmware, or fixed logic circuitry that is implemented in connection with processing and control circuits, which are generally identified at 912. Although not shown, device 900 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 900 also includes computer-readable storage media 914, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 900 can also include a mass storage media device (device media) 916.

Computer-readable storage media 914 provides data storage mechanisms to store device data 904, as well as various device applications 918 and any other types of information and/or data related to operational aspects of device 900. For example, an operating system 920 can be maintained as a computer application with the computer-readable storage media 914 and executed on processors 910. The device applications 918 may include a device manager, such as any form of a control application, software application, signal-processing and control module, code that is native to a particular device, a hardware abstraction layer for a particular device, and so on.

The device applications 918 also include any system components, modules, or managers to implement the techniques, such as functional software entities 128, workflow manager 130, user interface 132, and synapses 134.

Conclusion

Although embodiments of techniques and apparatuses enabling user-creatable custom workflows have been described in language specific to features and/or methods, it is to be understood that the subject of the appended claims is not necessarily limited to the specific features or methods described. Rather, the specific features and methods are disclosed as example implementations enabling user-creatable custom workflows.

What is claimed is:

1. A computer-implemented method comprising: exposing event-action pairs from respective operation histories of a plurality of discrete and separable applications;

receiving selection of a first exposed event, the first exposed event internal to a first application of the plurality of discrete and separable applications and selected from a plurality of events from a first operation history of the first application;

receiving selection of a first exposed action, the first exposed action internal to the first application and selected from a plurality of actions of the first operation history;

creating a first synapse connecting the first selected event to the first selected action;

receiving selection of a second exposed event, the second exposed event internal to a second application of the plurality of discrete and separable applications and selected from a second operation history of the second application, the second application being a stand-alone application separate from the first application;

receiving selection of a second exposed action, the second exposed action internal to the second application and selected from the second operation history;

creating a second synapse connecting the second selected event to the second selected action; and building a workflow using the first and second synapses, the workflow configured to perform the first and second selected actions responsive to the respective first and second selected events.

2. A computer-implemented method as described in claim 1, wherein the first selected action is a specific activity that is executed by the first application if the first event occurs.

3. A computer-implemented method as described in claim 1, further comprising receiving selection of an event filter, the event filter a condition for the first selected action to be executed, and wherein building the workflow configures the workflow to cause the first application to perform the first selected action responsive to the condition being satisfied.

4. A computer-implemented method as described in claim 1, further comprising receiving selection of an action parameter, the action parameter mapped to a static or varying value, and wherein building the workflow configures the workflow to cause the first application to perform the first selected action including the static or varying value.

5. A computer-implemented method as described in claim 1, further comprising:

receiving selection of another exposed event internal to the first application, the exposed event capable of being caused by the selected action;

receiving selection of another exposed action internal to the first application; and creating another synapse connecting the selected other event and the selected other action, and wherein building the workflow also uses the other synapse, the workflow configured to cause the first application to perform the first selected action responsive to the first selected event and then, after the first selected action, perform the other selected action responsive to the other selected event caused by the other selected action.

6. A computer-implemented method as described in claim 1, wherein the workflow is built using a liquid markup language.

7. A computer-implemented method as described in claim 1, wherein the operation histories of the plurality of discrete and separable applications comprises an activity log of interactions of a user with the plurality of discrete and separable applications.

8. A computer-implemented method as described in claim 1, wherein the first application is an email application and the second application is a graphic design program.

9. One or more non-transitory computer-readable storage media comprising computer-readable instructions that, responsive to execution by one or more processors, perform operations comprising:

exposing, in a user interface, selectable items including:

one or more event contexts;

events, each of the events tailored to at least one of the event contexts;

event filters;

action contexts;

actions; and action parameters from respective operation histories of a plurality of separate applications; and building a workflow based on selections of one or more of said selectable items exposed from the respective operation histories of the plurality of separate applications, the selections received through the user interface, the workflow configured to cause, responsive to a selected event occurring within a selected event context to which the selected event is tailored and with a selected event filter satisfied, a selected action, the selected action performed within a selected action context and according to a selected action parameter.

10. One or more non-transitory computer-readable storage media according to claim 9, wherein the exposing presents a graphically selectable list of the event contexts, the events, the event filters, the action contexts, the actions, or the action parameters.

11. One or more non-transitory computer-readable storage media according to claim 9, wherein the events exposed are tailored to the selected event context.

12. One or more non-transitory computer-readable storage media according to claim 9, wherein the operation histories of the plurality of separate applications comprises an activity log of interactions of a user with the plurality of separate applications.

13. One or more non-transitory computer-readable storage media according to claim 9, wherein the events are presented in the user interface responsive to selection of one of the one or more event contexts, the events presented being tailored to the selected event context.

14. One or more non-transitory computer-readable storage media comprising computer-readable instructions that, responsive to execution by one or more processors, perform operations comprising:

receiving a history including an activity log of a user's interactions with, and operations performed by, a plurality of stand-alone applications, each of the plurality of stand-alone applications designed to perform an activity independent of others of the stand-alone applications;

determining, based on the history, synapses correlating events and actions between the plurality of stand-alone applications, the correlated events and actions determined from the operations performed by the plurality of stand-alone applications, the synapses unable to be correlated within a single application of the plurality of stand-alone applications;

enabling selection of one of the synapses; and responsive to selection of one of the synapses, building a workflow based on the selected synapse determined from the history, the workflow configured to cause a stand-alone application of the plurality of stand-alone applications to perform the correlated action of the selected synapse responsive to occurrence of the correlated event from another stand-alone application of the plurality of stand-alone applications of the selected synapse.

15. One or more non-transitory computer-readable storage media according to claim 14, wherein the correlated event is one of the operations performed by the other stand-alone application without interaction by the user and the correlated action is one of the operations performed by the stand-alone application, the correlated action caused by interaction with the user.

16. One or more non-transitory computer-readable storage media according to claim 14, wherein the history includes timing of the operations and the interactions and determining synapses is based at least in part on amounts of time between the operations performed by the plurality of stand-alone applications and the interactions with the plurality of stand-alone applications by the user.

17. One or more non-transitory computer-readable storage media according to claim 14, wherein receiving the history includes scanning the activity log of the user and determining synapses includes finding patterns of activities in the activity log and correlating sequential operations in the found patterns.

18. One or more non-transitory computer-readable storage media according to claim 14, wherein enabling selection of the one or more synapses includes presenting, in a user interface, selectable events and actions.

19. One or more non-transitory computer-readable storage media according to claim 14, wherein determining the synapses determines, based on the history, action parameters to include with the correlated action.

20. One or more non-transitory computer-readable storage media according to claim 14, wherein determining the synapses determines, based on the history, an event filter that is a condition to the correlated action.

21. One or more non-transitory computer-readable storage media according to claim 14, wherein the other stand-alone application is an email application and the stand-alone application is a graphic design program.

* * * * *